(12) United States Patent
Rocci

(10) Patent No.: US 7,086,099 B2
(45) Date of Patent: Aug. 8, 2006

(54) SINK COVER AND WORK SURFACE

(75) Inventor: Joseph A. Rocci, Burr Ridge, IL (US)

(73) Assignee: Etcon Corp., Tinley Park, IL (US)

(*) Notice: Subject to any disclaimer, the term of this patent is extended or adjusted under 35 U.S.C. 154(b) by 198 days.

(21) Appl. No.: 10/839,462

(22) Filed: May 5, 2004

(65) Prior Publication Data
US 2005/0044626 A1 Mar. 3, 2005

Related U.S. Application Data

(60) Provisional application No. 60/499,756, filed on Sep. 3, 2003.

(51) Int. Cl.
A47L 19/02 (2006.01)

(52) U.S. Cl. ......................................................... 4/656

(58) Field of Classification Search ................... 4/580, 4/630–631, 637–638, 654, 656
See application file for complete search history.

(56) References Cited

U.S. PATENT DOCUMENTS 1,641,061 A    8/1927   Young
1,841,143 A    1/1932   McCann
2,194,343 A    3/1940   Wexler
2,308,123 A    1/1943   Stein
2,314,157 A    3/1943   O'Brien
2,334,293 A    11/1943  Stein
2,447,788 A    8/1948   Ball
2,746,062 A    5/1956   Waltz
3,346,888 A    10/1967  Paysinger
3,451,069 A *  6/1969   Cronin, Sr. .................... 4/580
3,988,784 A    11/1976  Reedy et al.
4,480,343 A    11/1984  Drach
5,406,656 A    4/1995   Somerton
5,621,929 A    4/1997   Smith
5,815,855 A    10/1998  McKeehan et al.
D418,909 S     1/2000   Mockett
6,182,305 B1   2/2001   O'Connell et al.
D449,875 S     10/2001  Fludd-Robinson et al.
6,341,704 B1   1/2002   Michel, Jr.

* cited by examiner

Primary Examiner—Charles E. Phillips
(74) Attorney, Agent, or Firm—Robert A. McCann; Aimee E. McVady

(57) ABSTRACT

A cover positioned over a sink to provide a temporary work surface. The cover includes an upper surface and a bottom surface. The bottom surface has a plurality of integral support ribs. The bottom surface also has an integral hook for hanging the cover from the side of the sink for storage.

5 Claims, 6 Drawing Sheets

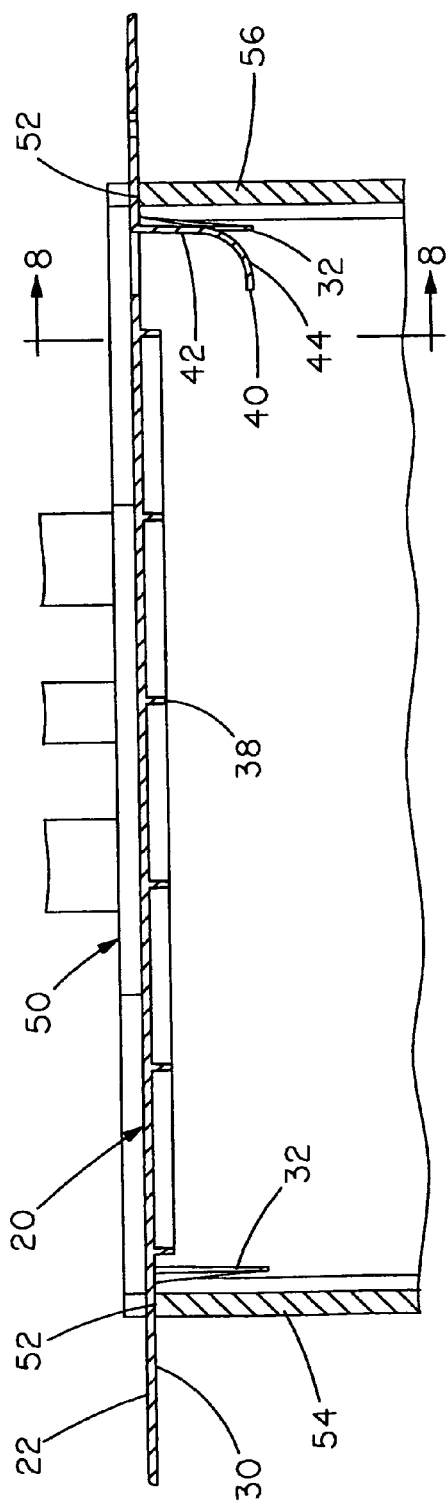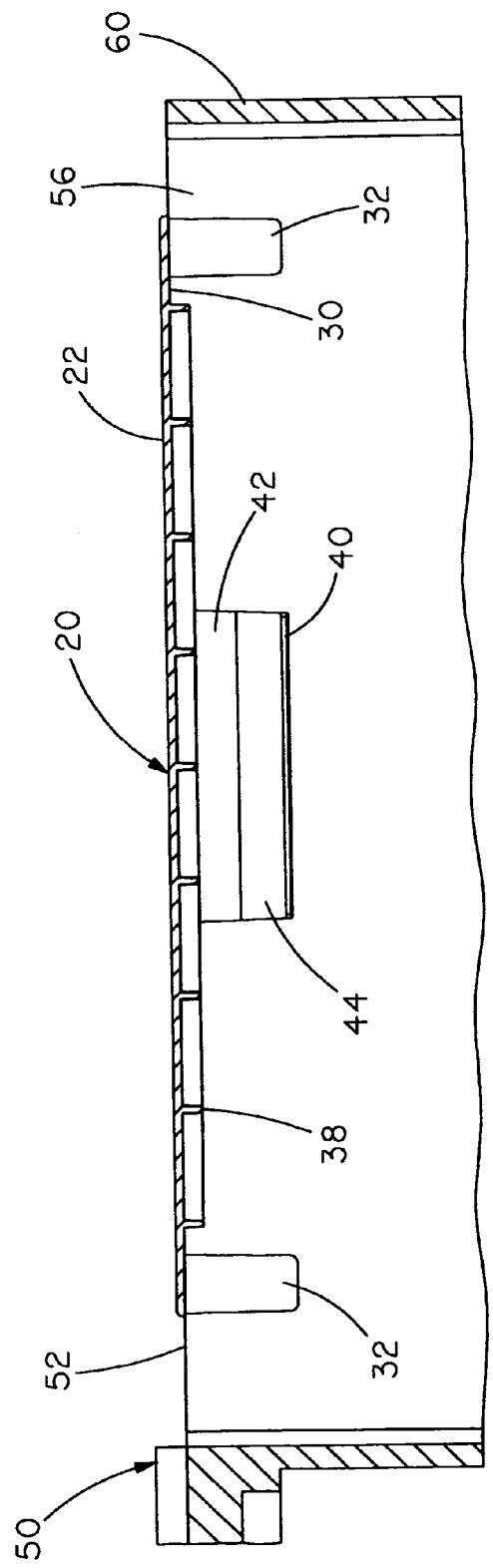

SINK COVER AND WORK SURFACE

CROSS REFERENCE TO RELATED APPLICATION

This application claims priority to U.S. Provisional Application Ser. No. 60/499,756, filed on Sep. 3, 2003, the entirety of which is hereby incorporated by reference.

FIELD OF THE INVENTION

The present invention relates to a lid or cover that is placed over a tub or a sink, and more particularly, to a lid or cover that is placed on a tub or sink for providing a temporary work surface and a lid or cover that is hung from the side of the tub or sink for storage.

BACKGROUND OF THE INVENTION

In kitchens or utility rooms, sinks typically reduce the amount of available counter space. Cutting boards and various drainage devices have been designed to be installed within the sink to increase the available food preparation area or work surface. The preparation area or work surface that is created, however, would only support various food items or utensils of minimum weight. Additionally, the cutting boards and drainage devices can be cumbersome to remove from the sink and store when they are not being used.

Therefore, it is desirable to provide a work surface that is capable of enduring a substantial load. It is also desirable to provide a work surface that is easy to store in a convenient fashion.

SUMMARY OF THE INVENTION

The present invention is directed to a cover for providing a work surface over a sink. The cover includes a board with an upper surface and a bottom surface. The bottom surface of the board has a plurality of integral support ribs. The bottom surface of the board also includes an integral hook for hanging the board from the side of the sink for storage.

BRIEF DESCRIPTION OF FIGURES

FIG. 7 is a cross sectional view of the sink cover and work surface taken along line 7—7 of FIG. 6;

FIG. 8 is a cross sectional view of the sink cover and work surface taken along line 8—8 of FIG. 7;

DETAILED DESCRIPTION OF PREFERRED EMBODIMENTS

Figure 1:
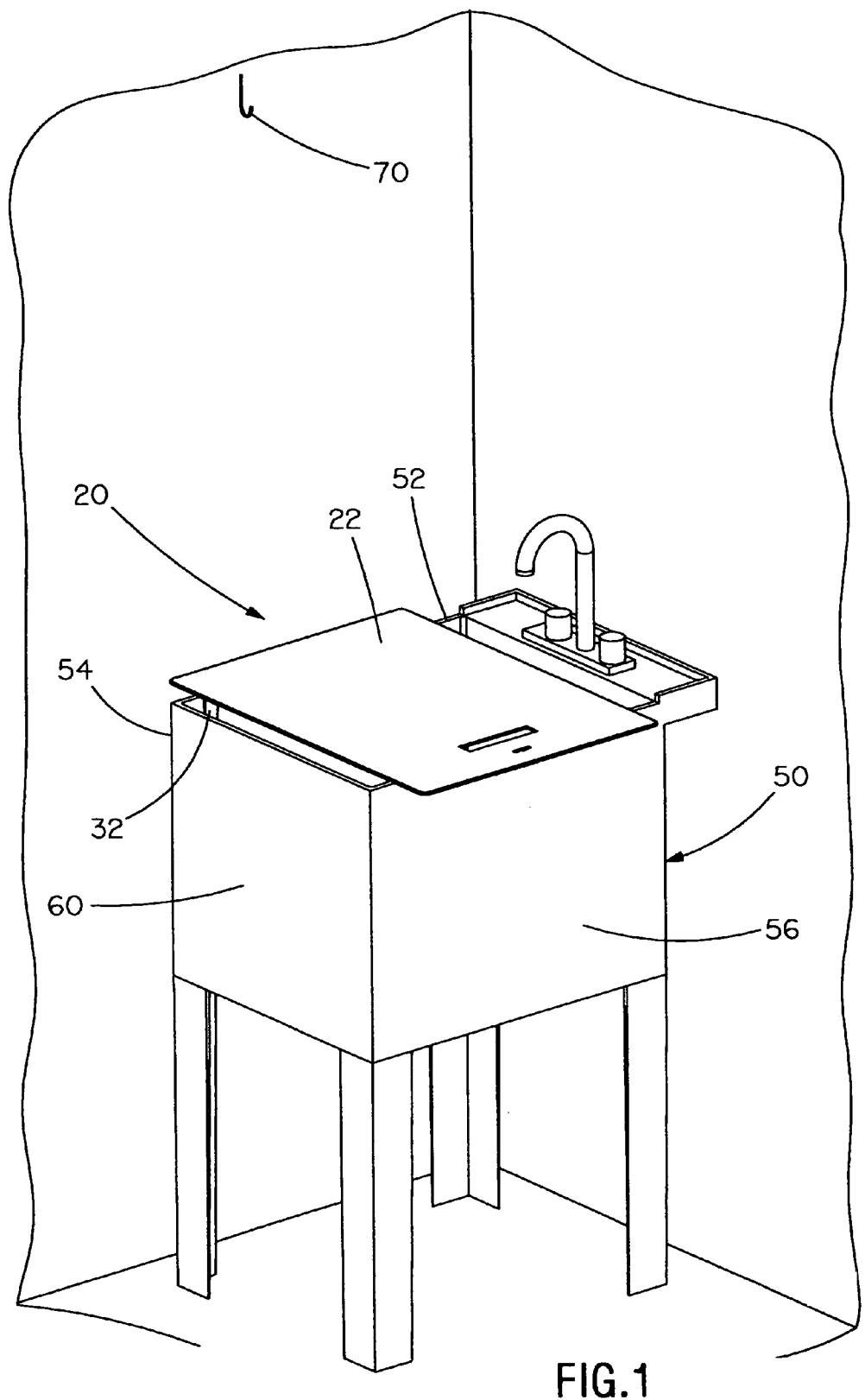
FIG. 1 is a perspective view of the sink cover and work surface of the present invention installed on a sink.

The lid or cover of the present invention, illustrated in general at 20, is designed to be placed over a tub, sink, basin or other similar device to create a work surface. FIG. 1 illustrates the cover 20 of the present invention installed on a utility sink 50. The cover 20 is a board with an upper surface 22 and a bottom surface 30. The cover 20 extends from one side 54 of the sink to an opposite side 56 of the sink so that the width of the sink is covered. In the illustrated embodiment, the cover has a rectangular shape. The cover, however, may be formed from other shapes, such as circular or oblong, to match the shape of the sink. As a result, when the cover is positioned on the sink, the upper surface 22 creates a temporary work surface over the sink 50.

Figure 2:
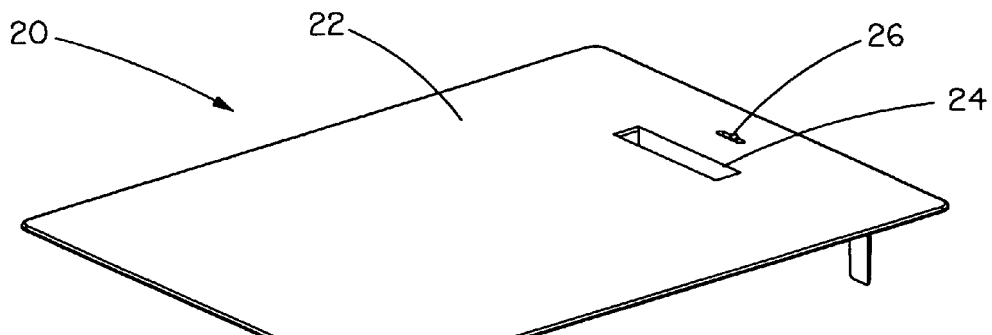
FIG. 2 is a top perspective view of the sink cover and work surface of FIG. 1.

FIG. 2 illustrates the upper surface 22 of the cover 20. The upper surface 22 is preferably flat and smooth to provide a level work surface. The cover 20 includes a rectangular opening 24 and a small aperture 26. The rectangular opening 24 acts as a handle by providing the user an area to insert their hand to grasp the bottom surface of the cover to carry or hold the cover. The opening 24 may be formed from various shapes as long as the user is able to insert their hand into the opening. As will be described with respect to FIGS. 11–13, the small aperture 26 is designed to receive a hook 70, nail or similar fastening device when it is desirable to hang the cover on a wall or other surface near the sink for storage.

Figure 3:
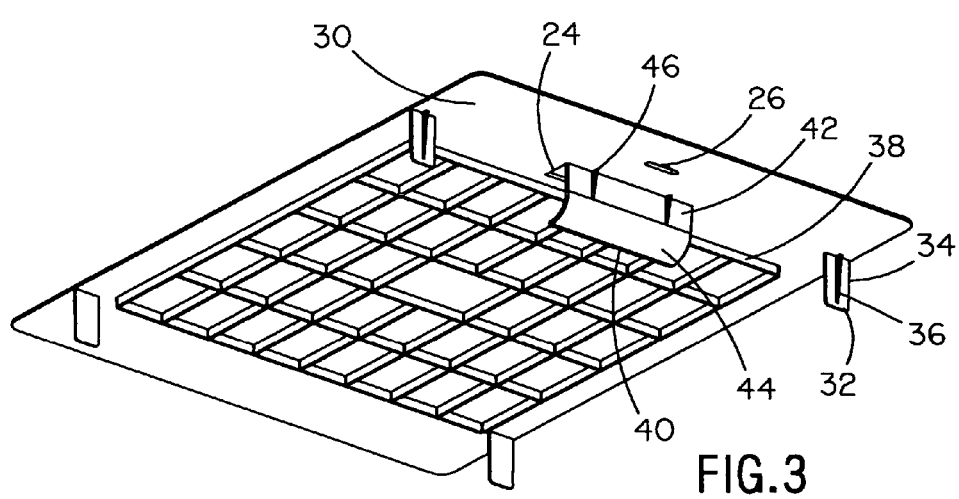
FIG. 3 is a bottom front perspective view of the sink cover and work surface of FIG. 1.
Figure 4:
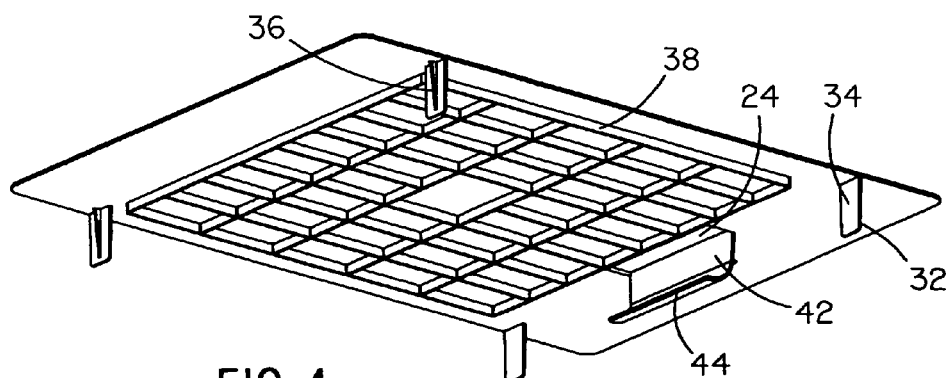
FIG. 4 is a bottom back perspective view of the sink cover and work surface of FIG. 1.
Figure 5:
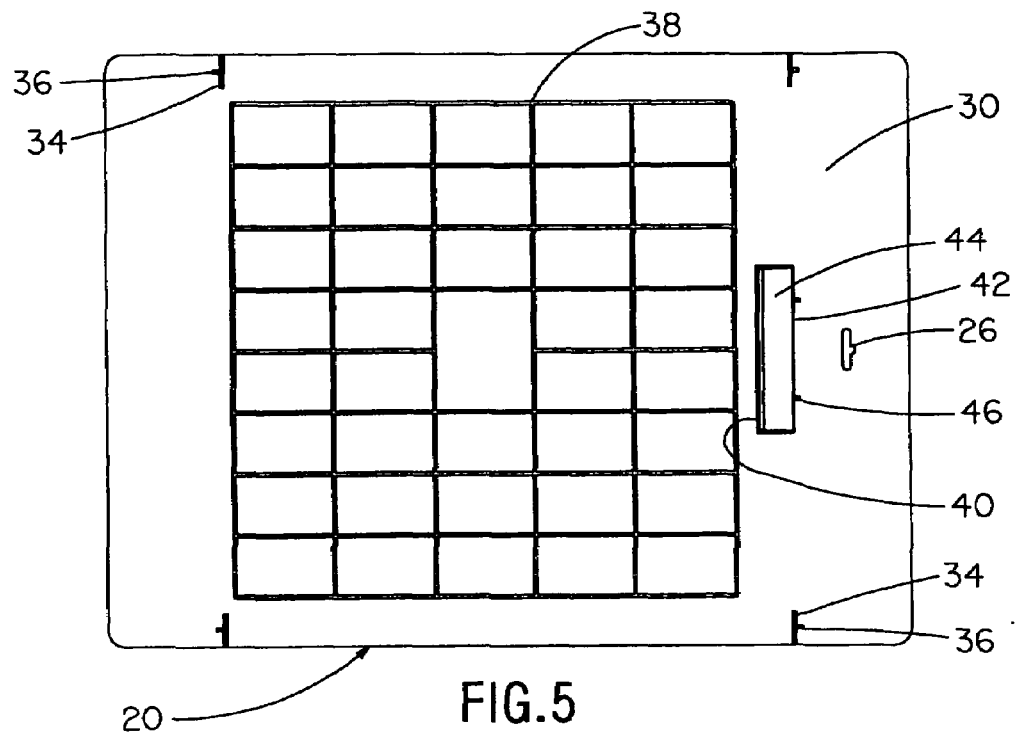
FIG. 5 is a bottom plan view of the sink cover and work surface of FIG. 1.

FIGS. 3–5 illustrate the bottom surface 30 of the cover 20. The bottom surface 30 includes a plurality of integral feet 32, integral support ribs 38 and an integral hook 40. In the preferred embodiment, at least one foot 32 extends downwardly from the cover 20 near each corner of the bottom surface 30. The feet 32 are rectangular projections 34 with a wedge shaped support 36 located at the center of the outside surface of each projection 34. The feet 32 provide stability to the cover by acting as stops when the cover is positioned on the sink. The feet 32 fit inside the sink to prevent the temporary work surface from moving.

The integral support ribs 38 extend downwardly from the bottom surface 30 of the cover 20. As shown in FIGS. 3–5, the integral support ribs 38 intersect with each other to form a pattern that is centered over a majority of the bottom surface 30. The integral support ribs 38 enable the cover 20 to be used as a work surface since the support ribs 38 allow the cover to accommodate heavy loads without breaking or significantly deflecting. The pattern of the support ribs 38 may vary, however, the support ribs 38 should extend from the center of the bottom surface 30 in order to provide adequate support for the cover 20.

The integral hook 40 extends downwardly from the bottom surface 30 and is located adjacent to the rectangular opening 24 in the cover 20. The integral hook 40 includes a generally vertical portion 42 and a generally curved portion 44. The vertical portion 42 extends from the bottom surface 30 and leads to the curved portion 44. The vertical portion 42 also includes at least one wedge shaped support 46 extending from the outside surface of the vertical portion 42.

Figure 6:
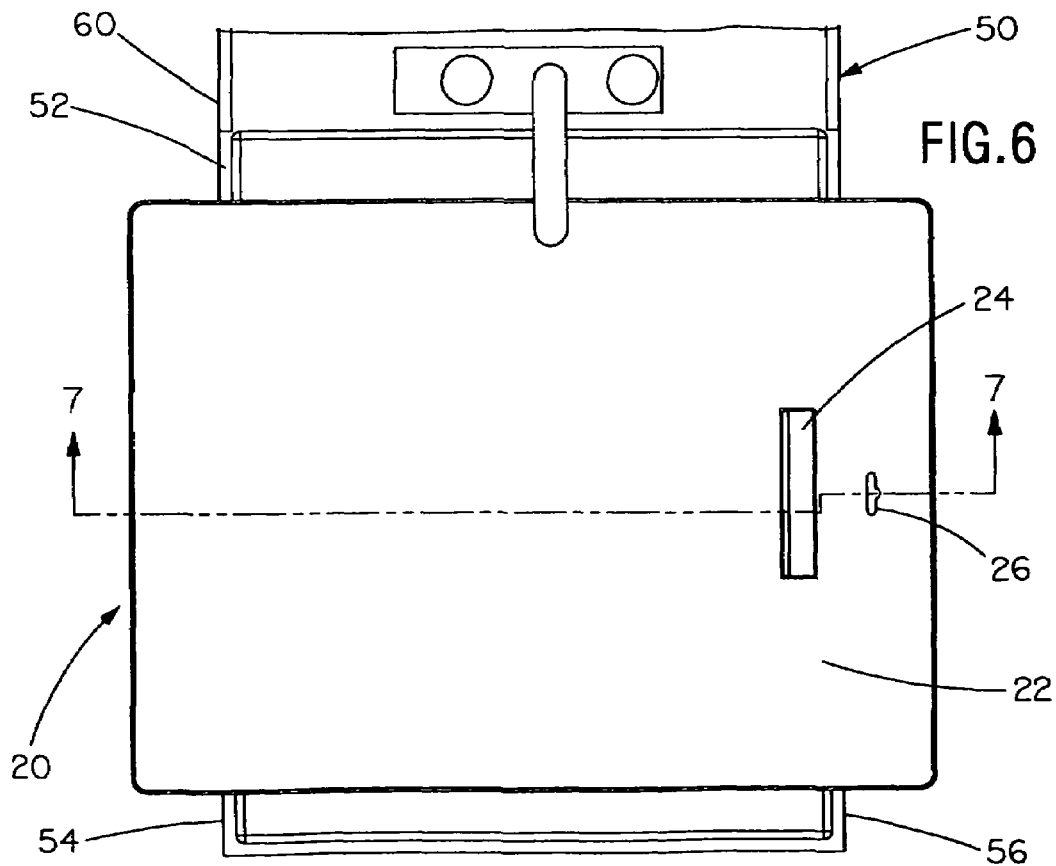
FIG. 6 is a top plan view of the sink cover and work surface of FIG. 1 installed on the sink.

FIGS. 6–8 illustrate the cover 20 installed on the sink 50. The cover 20 is placed over the opening in the sink 50 such that the feet 32 are positioned inside of the sink 50 and a portion of the cover overlaps the upper edge 52 of the sink.

Figure 9:
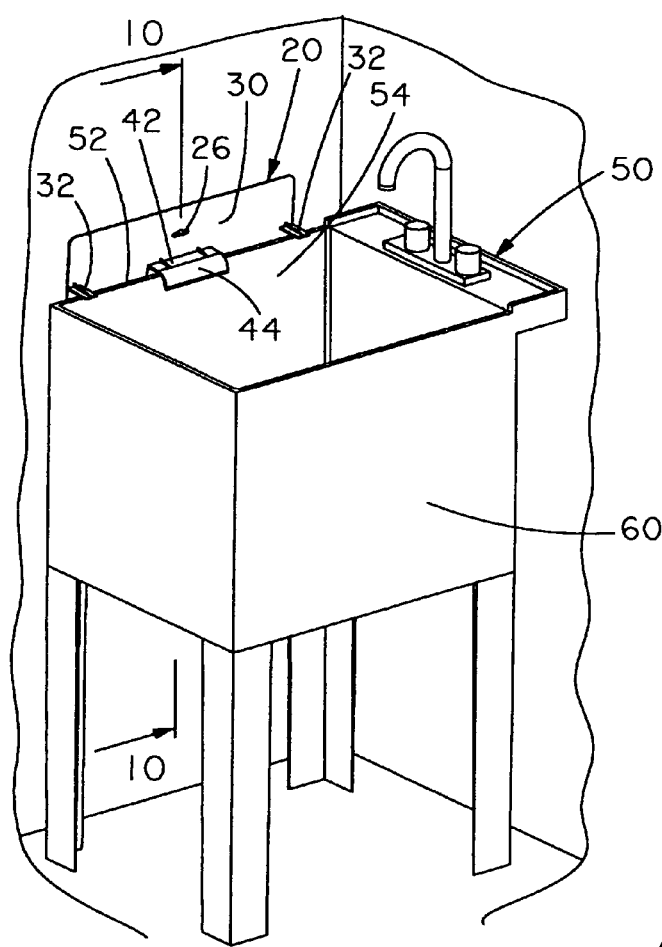
FIG. 9 is a perspective view of the sink cover and work surface of FIG. 1 hanging from a hook at the side of the sink.
Figure 10:
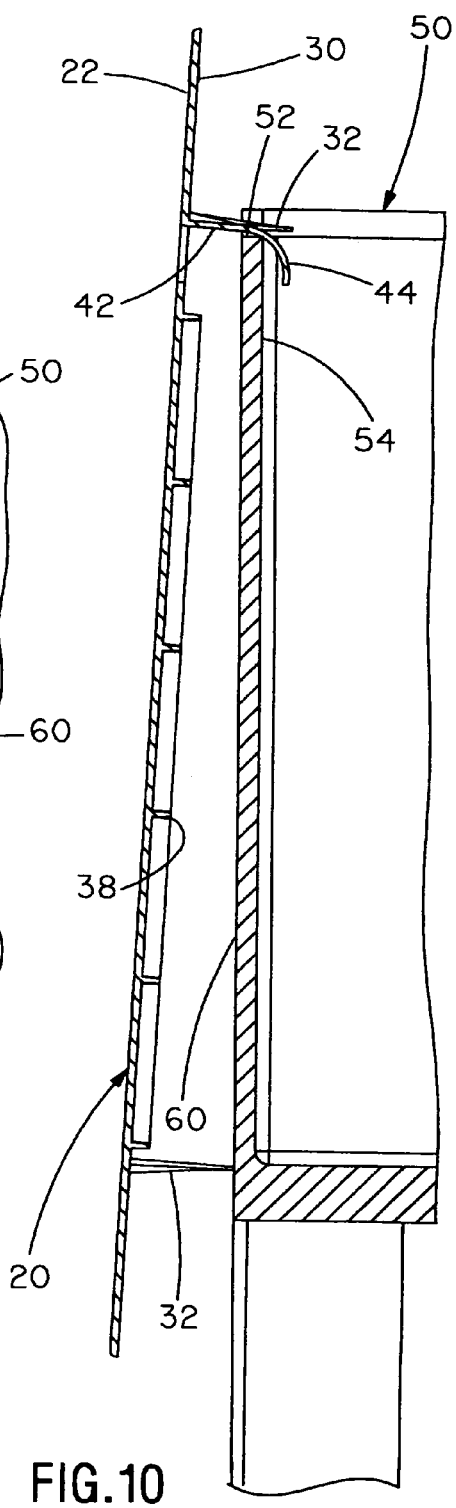
FIG. 10 is a cross sectional view of the sink cover and work surface stored along the side of the sink taken along line 10—10 of FIG. 9.

When the temporary work surface is no longer required, the cover 20 may be removed from the sink 50 for storage. As shown in FIGS. 9 and 10, the cover 20 may be stored by hanging it from a side of the sink. In order to store the cover from a side of the sink, the cover should be positioned such that the bottom surface 30 of the cover 20 faces the outer surface 60 of the sink and the integral hook 40 engages the upper edge 52 of the sink 50. As shown in FIG. 10, when the cover is hanging from the sink, part of the vertical portion 42 and part of the curved portion 44 of the hook 40 engage the upper edge 52 of the sink 50. The remainder of the curved portion 44 is positioned just inside the sink 50 to prevent the cover 20 from falling or sliding off of the upper edge 52 of the sink 50. Thus, the integral hook 40 enables the cover 20 to remain suspended from the sink 50. As shown in FIG. 9, the cover 20 is conveniently stored out of the way but it is easily accessible for future use.

Figure 11:
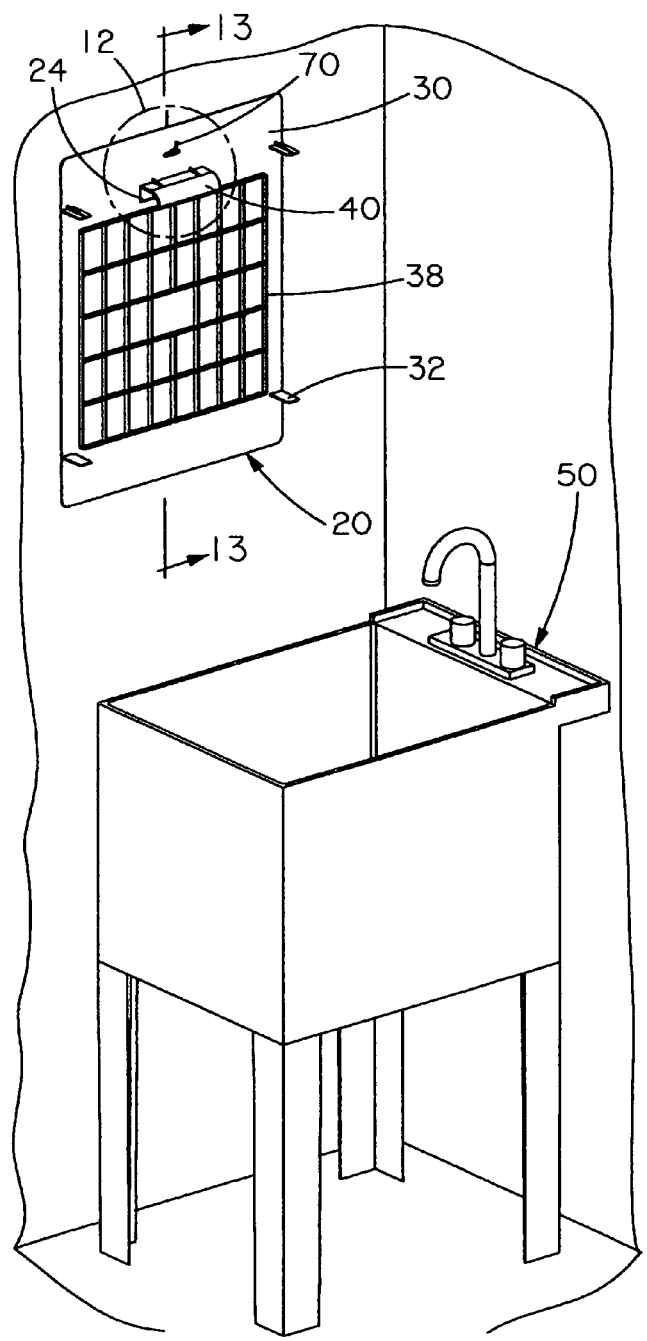
FIG. 11 is a perspective view of an alternative method of storing the sink cover and work surface of FIG. 1.
Figure 12:
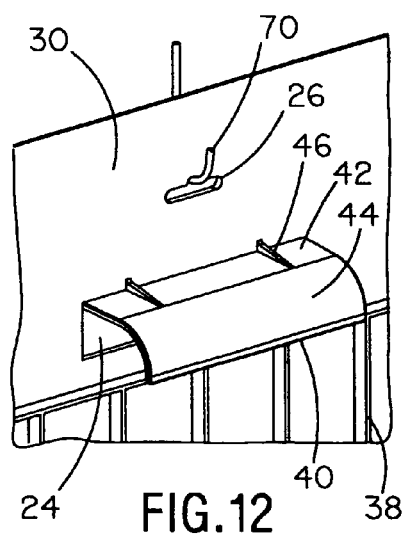
FIG. 12 is a perspective view of the alternative method of storing the sink cover and work surface of FIG. 11.
Figure 13:
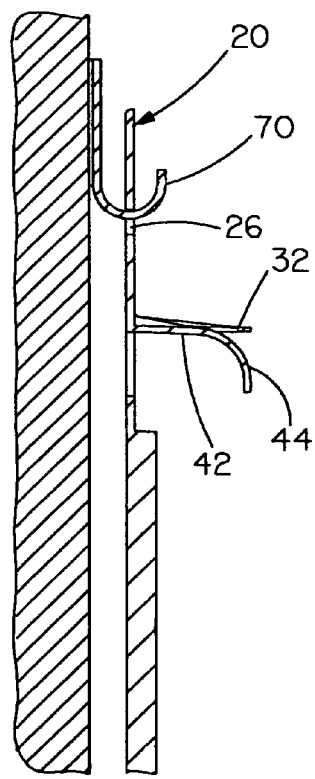
FIG. 13 is a cross sectional view of the alternative method of storing the sink cover and work surface taken along line 13—13 of FIG. 11.

Often the upper edges 52 of the sink 50 are too wide to receive the hook 40 that extends from the bottom surface 30 of the cover 20. Additionally, the sink 50 may be surrounded by cabinets such that the cover 20 would not be able to hang from the upper edge 52 along the outer surface 60 of the sink 50. Thus, it is desirable to provide an alternative method for storing the cover 20 of the present invention. As shown in FIGS. 11–13, the cover 20 may be stored by hanging it from a fastener that has been secured to the wall. In FIGS. 11–13, a J-shaped hook 70 is secured to the wall above the sink 50. The cover 20 is hung by inserting the J-shaped hook 70 into the small aperture 26 in the cover. The cover 20 is positioned so that the small aperture 26 engages the center of the J-shaped hook and the upper surface 22 of the cover is adjacent to the wall. The cover 20 may be hung from other fasteners, such as nails, as long as the fastener is capable of supporting the cover.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A cover for providing a work surface over a sink, the cover comprising:
   a board with an upper surface and a bottom surface, the bottom surface has a plurality of integral support ribs and an integral hook for hanging the board from the side of the sink for storage, wherein the integral hook has a vertical portion, a curved portion and a support positioned on the vertical portion, whereby the curved portion prevents the board from sliding off of the sink when the board is hung from the side of the sink.

2. The cover of claim 1, wherein the integral support ribs extend downwardly from the center of the bottom surface.

3. The cover of claim 1, wherein the board has an opening for providing a handle to hold the board.

4. The cover of claim 1, wherein the board has an aperture for receiving a fastener to hang the board for storage.

5. The cover of claim 1, wherein the bottom surface further comprises integral projections for providing stability to the board when installed on the sink.

* * * * *

UNITED STATES PATENT AND TRADEMARK OFFICE
CERTIFICATE OF CORRECTION

PATENT NO. : 7,086,099 B2
APPLICATION NO. : 10/839462
DATED : August 8, 2006
INVENTOR(S) : Joseph A. Rocci It is certified that error appears in the above-identified patent and that said Letters Patent is hereby corrected as shown below:

Title Page, Item (73) Assignee: To Read,

-- (73) Assignee: "Etcon Corp.,Tinley Park, IL (US)" should read:
-- Etcon Corp., Burr Ridge, IL (US) --.

Signed and Sealed this

Twenty-ninth Day of April, 2008

JON W. DUDAS
*Director of the United States Patent and Trademark Office*